US008209192B2

(12) United States Patent
Gil et al.

(10) Patent No.: US 8,209,192 B2
(45) Date of Patent: Jun. 26, 2012

(54) METHOD OF MANAGING CARBON REDUCTION FOR HYDROCARBON PRODUCERS

(75) Inventors: Henry Gil, Calgary (CA); Andrew Squires, Calgary (CA)

(73) Assignee: Osum Oil Sands Corp. (CA)

( * ) Notice: Subject to any disclaimer, the term of this patent is extended or adjusted under 35 U.S.C. 154(b) by 342 days.

(21) Appl. No.: 12/469,374

(22) Filed: May 20, 2009

(65) Prior Publication Data

US 2009/0292571 A1 Nov. 26, 2009

Related U.S. Application Data

(60) Provisional application No. 61/054,727, filed on May 20, 2008.

(51) Int. Cl.
*G06Q 10/00* (2012.01)

(52) U.S. Cl. ........................................... 705/1.1

(58) Field of Classification Search ................ None
See application file for complete search history.

(56) References Cited

U.S. PATENT DOCUMENTS

| | | |
|---|---|---|
| 604,330 A | 5/1898 | Kibling |
| 1,520,737 A | 12/1924 | Wright |
| 1,634,236 A | 6/1927 | Ranney |
| 1,660,187 A | 2/1928 | Ehrat |
| 1,660,818 A | 2/1928 | Leo |
| 1,722,679 A | 7/1929 | Ranney |
| 1,936,643 A | 10/1929 | Reed |
| 1,735,012 A | 11/1929 | Rich |
| 1,735,481 A | 11/1929 | Uren |
| 1,811,560 A | 6/1931 | Ranney |
| 1,816,260 A | 7/1931 | Lee |
| 1,852,717 A | 4/1932 | Grinnell et al. |
| 1,884,859 A | 10/1932 | Ranney |
| 1,910,762 A | 5/1933 | Grinnell et al. |
| 2,148,327 A | 2/1939 | Smith et al. |
| 2,193,219 A | 3/1940 | Bowie et al. |
| 2,200,665 A | 5/1940 | Bolton |
| 2,210,582 A | 8/1940 | Grosse et al. |
| 2,365,591 A | 12/1944 | Ranney |
| 2,670,801 A | 3/1954 | Sherborne |

(Continued)

FOREIGN PATENT DOCUMENTS

CA 986146 3/1976

(Continued)

OTHER PUBLICATIONS

International Preliminary Report on Patentability for International (PCT) Application No. PCT/IB2009/006522, mailed Dec. 2, 2010.

(Continued)

*Primary Examiner* — John Hayes
*Assistant Examiner* — George Chen
(74) *Attorney, Agent, or Firm* — Sheridan Ross P.C.

(57) ABSTRACT

A method and means is disclosed for managing the reduction of carbon during product transport for a large number of hydrocarbon fuel producers within a given geographic region. This reduction of carbon is accomplished at a few major sequestration hubs located within the geographic region where the sequestration hubs themselves pass through or near major carbon dioxide sequestration facilities. The method includes reducing the amount of carbon in the product and providing a carbon credit or a carbon tax benefit to the producer as an additional alternative available to the producer than acquiring a carbon credit, paying a carbon tax or installing on-site capture and sequestration facilities.

27 Claims, 6 Drawing Sheets

U.S. PATENT DOCUMENTS

| | | | |
|---|---|---|---|
| 2,783,986 A | 3/1957 | Nelson et al. |
| 2,786,660 A | 3/1957 | Alleman |
| 2,799,641 A | 7/1957 | Bell |
| 2,823,752 A | 2/1958 | Hellmuth |
| 2,857,002 A | 10/1958 | Pevere et al. |
| 2,888,987 A | 6/1959 | Parker |
| 2,914,124 A | 11/1959 | Ripley, Jr. |
| 2,989,294 A | 6/1961 | Coker |
| 3,017,168 A | 1/1962 | Carr |
| 3,024,013 A | 3/1962 | Rogers et al. |
| 3,034,773 A | 5/1962 | Legatski |
| 3,207,221 A | 9/1965 | Cochran et al. |
| 3,227,229 A | 1/1966 | Wakefield, Jr. |
| 3,259,186 A | 7/1966 | Dietz |
| 3,285,335 A | 11/1966 | Reistle, Jr. |
| 3,333,637 A | 8/1967 | Prats |
| 3,338,306 A | 8/1967 | Cook |
| 3,353,602 A | 11/1967 | Geertsma |
| 3,362,751 A | 1/1968 | Tinlin |
| 3,386,508 A | 6/1968 | Bielstein et al. |
| 3,455,392 A | 7/1969 | Prats |
| 3,456,730 A | 7/1969 | Lange |
| 3,474,863 A | 10/1969 | Deans et al. |
| 3,530,939 A | 9/1970 | Turner et al. |
| 3,613,806 A | 10/1971 | Malott |
| 3,620,313 A | 11/1971 | Elmore et al. |
| 3,678,694 A | 7/1972 | Haspert |
| 3,759,575 A | 9/1973 | Boyd et al. |
| 3,768,559 A | 10/1973 | Allen et al. |
| 3,778,107 A | 12/1973 | Haspert |
| 3,784,257 A | 1/1974 | Lauber et al. |
| 3,833,059 A | 9/1974 | Sisson |
| 3,838,738 A | 10/1974 | Redford et al. |
| 3,882,941 A | 5/1975 | Pelofsky |
| 3,884,261 A | 5/1975 | Clynch |
| 3,888,543 A | 6/1975 | Johns |
| 3,922,148 A | 11/1975 | Child |
| 3,922,287 A | 11/1975 | Pawson et al. |
| 3,924,895 A | 12/1975 | Leasure |
| 3,937,025 A | 2/1976 | Alvarez-Calderone |
| 3,941,423 A | 3/1976 | Garte |
| 3,946,810 A | 3/1976 | Barry |
| 3,948,323 A | 4/1976 | Sperry et al. |
| 3,954,140 A | 5/1976 | Hendrick |
| 3,960,408 A | 6/1976 | Johns |
| 3,986,557 A | 10/1976 | Striegler et al. |
| 3,992,287 A | 11/1976 | Rhys |
| 4,046,191 A | 9/1977 | Neath |
| 4,055,959 A | 11/1977 | Fritz |
| 4,064,942 A | 12/1977 | Prats |
| 4,067,616 A | 1/1978 | Smith et al. |
| 4,072,018 A | 2/1978 | Alvarez-Calderon |
| 4,076,311 A | 2/1978 | Johns |
| 4,085,803 A | 4/1978 | Butler |
| 4,099,388 A | 7/1978 | Husemann et al. |
| 4,099,570 A | 7/1978 | Vandergrift |
| 4,099,783 A | 7/1978 | Verty et al. |
| 4,106,562 A | 8/1978 | Barnes et al. |
| 4,116,487 A | 9/1978 | Yamazaki et al. |
| 4,144,935 A | 3/1979 | Bridges et al. |
| 4,149,597 A | 4/1979 | Redford |
| 4,152,027 A | 5/1979 | Fujimoto et al. |
| 4,160,481 A | 7/1979 | Turk et al. |
| 4,165,903 A | 8/1979 | Cobbs |
| 4,167,290 A | 9/1979 | Yamazaki et al. |
| 4,203,626 A | 5/1980 | Hamburger |
| 4,209,268 A | 6/1980 | Fujiwara et al. |
| 4,216,999 A | 8/1980 | Hanson |
| 4,224,988 A | 9/1980 | Gibson et al. |
| 4,227,743 A | 10/1980 | Ruzin et al. |
| 4,236,640 A | 12/1980 | Knight |
| 4,249,777 A | 2/1981 | Morrell et al. |
| 4,257,650 A | 3/1981 | Allen |
| 4,265,307 A | 5/1981 | Elkins |
| 4,279,743 A | 7/1981 | Miller |
| 4,285,548 A | 8/1981 | Erickson |
| 4,289,354 A | 9/1981 | Zakiewicz |
| 4,296,969 A | 10/1981 | Willman |
| 4,406,499 A | 9/1983 | Yildirim |
| 4,410,216 A | 10/1983 | Allen |
| 4,434,849 A | 3/1984 | Allen |
| 4,440,449 A | 4/1984 | Sweeney |
| 4,445,723 A | 5/1984 | McQuade |
| 4,455,216 A | 6/1984 | Angevine et al. |
| 4,456,305 A | 6/1984 | Yoshikawa |
| 4,458,945 A | 7/1984 | Ayler et al. |
| 4,458,947 A | 7/1984 | Hopley et al. |
| 4,463,988 A | 8/1984 | Bouck et al. |
| 4,486,050 A | 12/1984 | Snyder |
| 4,494,799 A | 1/1985 | Snyder |
| 4,502,733 A | 3/1985 | Grubb |
| 4,505,516 A | 3/1985 | Shelton |
| 4,533,182 A | 8/1985 | Richards |
| 4,536,035 A | 8/1985 | Huffman et al. |
| 4,545,435 A | 10/1985 | Bridges et al. |
| 4,566,961 A | 1/1986 | Diaz et al. |
| 4,575,280 A | 3/1986 | Hemphill et al. |
| 4,595,239 A | 6/1986 | Ayler et al. |
| 4,601,607 A | 7/1986 | Lehmann |
| 4,603,909 A | 8/1986 | LeJeune |
| 4,607,888 A | 8/1986 | Trent et al. |
| 4,607,889 A | 8/1986 | Hagimoto et al. |
| 4,611,855 A | 9/1986 | Richards |
| 4,682,471 A | 7/1987 | Wagner |
| 4,699,709 A | 10/1987 | Peck |
| 4,753,666 A | 6/1988 | Pastor et al. |
| 4,774,470 A | 9/1988 | Takigawa et al. |
| 4,793,736 A | 12/1988 | Thompson et al. |
| 4,808,030 A | 2/1989 | Takegawa |
| 4,856,936 A | 8/1989 | Hentschel et al. |
| 4,911,578 A | 3/1990 | Babendererde |
| 4,946,579 A | 8/1990 | Ocelli |
| 4,946,597 A | 8/1990 | Sury |
| 4,983,077 A | 1/1991 | Sorge et al. |
| 5,016,710 A | 5/1991 | Renard et al. |
| 5,032,039 A | 7/1991 | Hagimoto et al. |
| 5,051,033 A | 9/1991 | Grotenhofer |
| 5,125,719 A | 6/1992 | Snyder |
| 5,141,363 A | 8/1992 | Stephens |
| 5,174,683 A | 12/1992 | Grandori |
| 5,205,613 A | 4/1993 | Brown, Jr. |
| 5,211,510 A | 5/1993 | Kimura et al. |
| 5,217,076 A | 6/1993 | Masek |
| 5,280,814 A * | 1/1994 | Stroh ............................. 141/83 |
| 5,316,664 A | 5/1994 | Gregoli et al. |
| 5,330,292 A | 7/1994 | Sakanishi et al. |
| 5,339,898 A | 8/1994 | Yu et al. |
| 5,354,359 A | 10/1994 | Wan et al. |
| 5,375,539 A | 12/1994 | Rippberger |
| 5,446,980 A | 9/1995 | Rocke |
| 5,484,232 A | 1/1996 | Hayashi et al. |
| 5,516,967 A | 5/1996 | Pandey et al. |
| 5,534,136 A | 7/1996 | Rosenbloom |
| 5,534,137 A | 7/1996 | Griggs et al. |
| 5,626,726 A | 5/1997 | Kong et al. |
| 5,655,605 A | 8/1997 | Matthews |
| 5,656,136 A | 8/1997 | Gayaut et al. |
| 5,697,676 A | 12/1997 | Kashima et al. |
| 5,767,680 A | 6/1998 | Torres-Verdin et al. |
| 5,785,736 A | 7/1998 | Thomas et al. |
| 5,831,934 A | 11/1998 | Gill et al. |
| 5,852,262 A | 12/1998 | Gill et al. |
| 5,879,057 A | 3/1999 | Schwoebel et al. |
| 5,890,771 A | 4/1999 | Cass |
| 6,003,953 A | 12/1999 | Huang et al. |
| 6,017,095 A | 1/2000 | DiMillo |
| 6,027,175 A | 2/2000 | Seear et al. |
| 6,190,536 B1 | 2/2001 | Lokhandwala et al. |
| 6,206,478 B1 | 3/2001 | Uehara et al. |
| 6,257,334 B1 | 7/2001 | Cyr et al. |
| 6,263,965 B1 | 7/2001 | Schmidt et al. |
| 6,277,286 B1 | 8/2001 | Søntvedt et al. |
| 6,364,418 B1 | 4/2002 | Schwoebel |
| 6,399,030 B1 | 6/2002 | Nolan |
| 6,412,555 B1 | 7/2002 | Sten-Halvorsen et al. |
| 6,443,229 B1 | 9/2002 | Kulka |
| 6,554,368 B2 | 4/2003 | Drake et al. |

| | | | |
|---|---|---|---|
| 6,569,235 B2 | 5/2003 | Carter, Jr. | |
| 6,604,580 B2 | 8/2003 | Zupanick et al. | |
| 6,631,761 B2 | 10/2003 | Yuan et al. | |
| 6,679,326 B2 | 1/2004 | Zakiewicz | |
| 6,758,289 B2 | 7/2004 | Kelley et al. | |
| 6,767,518 B2 | 7/2004 | Ichikawa et al. | |
| 6,796,381 B2 | 9/2004 | Ayler et al. | |
| 6,857,487 B2 | 2/2005 | Galloway et al. | |
| 6,869,147 B2 | 3/2005 | Drake et al. | |
| 6,880,633 B2 | 4/2005 | Wellington et al. | |
| 6,890,497 B2 | 5/2005 | Rau et al. | |
| 6,929,330 B2 | 8/2005 | Drake et al. | |
| 6,948,562 B2 | 9/2005 | Wellington et al. | |
| 6,997,256 B2 | 2/2006 | Williams et al. | |
| 7,066,254 B2 | 6/2006 | Vinegar et al. | |
| 7,066,973 B1 | 6/2006 | Bentley | |
| 7,097,255 B2 | 8/2006 | Drake et al. | |
| 7,128,375 B2 | 10/2006 | Watson | |
| 7,185,707 B1 | 3/2007 | Graham | |
| 7,192,092 B2 | 3/2007 | Watson | |
| 7,240,730 B2 | 7/2007 | Williams et al. | |
| 7,264,788 B2 | 9/2007 | Hampden-Smith et al. | |
| 7,381,320 B2 | 6/2008 | Iqbal et al. | |
| 7,428,926 B2 | 9/2008 | Heins | |
| 7,448,692 B2 | 11/2008 | Drake et al. | |
| 7,461,901 B2 | 12/2008 | Drake et al. | |
| 7,691,788 B2 | 4/2010 | Tan et al. | |
| 2002/0143693 A1 | 10/2002 | Soestbergen et al. | |
| 2003/0146002 A1 | 8/2003 | Vinegar et al. | |
| 2003/0188863 A1* | 10/2003 | Gilbert et al. | 166/256 |
| 2004/0211559 A1 | 10/2004 | Nguyen et al. | |
| 2004/0249732 A1 | 12/2004 | Drummond | |
| 2005/0051362 A1 | 3/2005 | McGuire et al. | |
| 2006/0231455 A1 | 10/2006 | Olsvik et al. | |
| 2007/0039729 A1 | 2/2007 | Watson | |
| 2007/0044957 A1 | 3/2007 | Watson | |
| 2007/0181083 A1 | 8/2007 | Fulton et al. | |
| 2007/0237696 A1* | 10/2007 | Payton | 423/228 |
| 2007/0277438 A1 | 12/2007 | Lynch et al. | |
| 2008/0017416 A1 | 1/2008 | Watson et al. | |
| 2008/0078552 A1 | 4/2008 | Donnelly et al. | |
| 2008/0087422 A1 | 4/2008 | Kobler et al. | |
| 2008/0122286 A1 | 5/2008 | Brock et al. | |
| 2008/0308174 A1* | 12/2008 | Huglen | 141/11 |
| 2009/0084707 A1 | 4/2009 | Gil | |
| 2009/0100754 A1 | 4/2009 | Gil | |
| 2009/0139716 A1 | 6/2009 | Brock et al. | |
| 2009/0194280 A1 | 8/2009 | Gil et al. | |

FOREIGN PATENT DOCUMENTS

| | | |
|---|---|---|
| CA | 986544 | 3/1976 |
| CA | 1165712 | 4/1984 |
| CA | 1167238 | 5/1984 |
| CA | 1224911 | 8/1987 |
| CA | 2124199 | 6/1992 |
| CA | 2222668 | 5/1998 |
| CA | 2340506 | 9/2001 |
| CA | 2526854 | 9/2001 |
| CA | 2583508 | 9/2001 |
| CA | 2583513 | 9/2001 |
| CA | 2583519 | 9/2001 |
| CA | 2583523 | 9/2001 |
| CA | 2358805 | 10/2001 |
| CA | 2315596 | 2/2002 |
| CA | 2332207 | 2/2002 |
| EP | 0120625 | 10/1986 |
| JP | 03-267497 | 11/1991 |
| WO | WO 01/69042 | 9/2001 |
| WO | WO 2007/133461 | 11/2007 |
| WO | WO 2008/051822 | 5/2008 |
| WO | WO 2008/131169 | 10/2008 |
| WO | WO 2008/138118 | 11/2008 |

OTHER PUBLICATIONS

"Vektron® 6913 No$_x$ Reduction Strategy Implementation Options," Infineum International Ltd., 2000, online: US EPA http://www.epa.gov.otaq.regs/fuels/additive/i-b-03b.pdf.

U.S. Appl. No. 12/782,293, filed May 18, 2010, Donnelly et al.

Haefeli et al., "Carbon Dioxide Capture and Storage Issues—Accounting and Baselines Under the United Nations Framework Convention on Climate Change (UNFCCC)," International Energy Agency, Paris, May 2004.

International Search Report for International (PCT) Application No. PCT/IB2009/006094, mailed Oct. 20, 2009.

Written Opinion for International (PCT) Application No. PCT/IB2009/006522, mailed Oct. 20, 2009.

U.S. Appl. No. 12/498,895, filed Jul. 7, 2009, Gil, et al.

"Carbon Sequestration Atlas of the United States and Canada", U.S. Department of Energy, Office of Fossil Energy, National Energy Technology Laboratory, Mar. 2007, available at http://www.netl.doe.gov/technologies/carbon_seq/refshelf/atlas/ATLAS.pdf, pp. 1-90.

"Liquefied Petroleum Gas" and "Natural Gas", Handbook of Fuels, 2008, Wiley-VCH Verlag GmbH & Co. KgaA, edited by Barbara Elvers, pp. 140-141 and 152-154.

"Plan of Operation, Shell Frontier Oil and Gas Inc., E-ICP Test Project", Oil Shale Research and Development Project, Prepared for Bureau of Land Management, Feb. 15, 2006, pp. 1-70.

Author Unknown, "A New Technology for the Recovery of Oil Sands," Oil Sands Underground Mining, Inc., presented at combined Oil Sands Task Force and Black Oil Pipeline Network Meeting, Jun. 2001, pp. 1-30.

Author Unknown, "Future of Oil Recovery from Underground Drill Sites", Underground Technology Research Council, Committee of Mine Assisted Oil Recovery, Dec. 1988, pp. 1-51.

Author Unknown, "Oil Mining: The Fourth Order of Oil Recovery", Compressed Air Magazine, Dec. 1983, pp. 6-10.

Author Unknown, "Technical Overview: Nigeria's Bitumen Belt and Developmental Potential", Ministry of Solid Minerals Development, Mar. 6, 2006, Available at http://64.233.167.104/search?q_cache:m12yiQ5o16EJ:msmd.gov.ng/privatisation/docs/Bitumen%2520Overview.pdf+SAGD+a..., printed Jan. 10, 2007, pp. 1-48.

Author Unknown, "Underground Mining of Oil Sands," Oil Sands Underground Mining, Inc., presented at National Oil Sands Task Force, Jan. 2001 Quarterly Meeting, pp. 1-38.

Butler, "Thermal Recovery of Oil and Bitumen", 2nd Printing by GravDrain, Inc., Calgary, Alberta,1998, Parts 1-8, pp. 1-548.

Canadian Heavy Oil Associate (CHOA) Annual Conference, Dec. 6, 2000, presentation by Oil Sands Underground Mining, Inc.

Corti, et al., "Athabasca Mineable Oil Sands: The RTR/Gulf Extraction Process Theoretical Model of Bitumen Detachment," The 4.sup.th UNITAR/UNDP International Conference on Heavy Crude and Tar Sands Proceedings, vol. 5, Edmonton, AB, Aug. 7-12, 1988, pp. 41-44, 71.

Czarnecki, Press Release; NSERC Industrial Research Chair in Oil Sands Syncrude Canada, Ltd, date unknown, pp. 1-3.

Deutsch et al., "Guide to SAGD (Steam Assisted Gravity Drainage) Reservoir Characterization Using Geostatistics", Centre for Computational Geostatistics (CCG) Guidebook Series vol. 3, 2005 (27 pages).

Dick, et al., "Oil Mining", U.S. Bureau of Mines, 1980, pp. 1-6.

Dobson, et al., "Mining Technology Assists Oil Recovery from Wyoming Field", Journal of Petroleum Technology, from Soc. Pet Eng., Apr. 1981, pp. 1-7.

Drake, "An Innovative Approach for the Underground Mining of Oil Sands," presented at North American Tunneling 2002, Seattle, WA May 2002 and NARMS-TAC 202, Mining and Tunneling Innovation and Opportunity Conference, Toronto, Ontario, Jul. 2002, pp. 1-8.

Drake, et al., "A Promising New Concept for Underground Mining of Oil Sands," technical papers presented to Canadian Institute of Mining (CIM), Ft. McMurray, Jun. 13-15, 2001, pp. 1-16.

Fontaine, et al., "An Evaluation of Oil Mining in Ohio Phase II", Sep. 1983, pp. 1-58.

Fontaine, et al., "Recommended Reservoir Engineering Testing Program for Oil Mining Projects", Jan. 1984, pp. 1-140.

Gallucci, et al., "SEM Analysis Application to Study CO2 Capture by Means of Dolomite", Open-Access Journal for the Basic Principles of Diffusion Theory, Experiment and Application, 2007, available at http://www.uni-leipzig.de/diffusion/journal/pdf/volume7/diff_fund_7(2007)5.pdf, pp. 1-11.

Hardy, "Feasibility Study for Underground Mining of Oil Sand", Department of Energy, Mines and Resources, Canada, Sep. 1977, pp. 1-314.

Harris, et al., "Feasibility of Underground Mining of Oil Sand", Alberta Oil Sands Information Center, 1978, pp. 1-33.

Huang, et al., "Wet Electric Heating for Starting Up SAGD/VAPEX", Alberta Research Council, Presented at the Petroleum Society's 5th Canadian International Petroleum Conference, Jun. 2004, pp. 1-12, Paper 2004-130, Petroleum Society: Canadian Institute of Mining, Metallurgy and Petroleum.

Hutchins, et al., "Mining for Petroleum: Feasibility Study", Energy Development Consultants, Inc., US Bureau of Mines Contract No. JO275002, Jul. 1978, pp. 1-365.

Hutchins, et al., "Oil Mining: An Emerging Technology", Wassum Mining Engineering, Dec. 1981, pp. 1-4.

Li, et al., "Prediction of Oil Production by Gravity Drainage", Stanford University, SPIE 84 184, Oct. 2003, pp. 1-8.

Mikula et al., "Commercial Implementation of a Dry Landscape Oil Sands Tailings Reclamation Option: Consolidated Tailings", Alberta Oil Sands Information Services; No. 1998.096, date unknown, pp. 907-921.

Mikula et al., "Oil Sands Conditioning, Bitumen Release Mechanisms, and New Process Development", Alberta Oil Sands Information Services, 1999, pp. 1-8.

Nasr, "Steam Assisted Gravity Drainage (SAGD): A New Oil Production Technology for Heavy Oil and Bitumens", CSEG Recorder, Alberta Research Council, Calgary, Canada, Mar. 2003, p. 42.

Oil Sands Underground Mining, Inc., "A Private Sector Approach to Design/Build," presented at NAT 2002, 34 pages.

O'Rourke, et al., "AOSTRA's Underground Test Facility (UTF): Mine-Assisted Recovery Under Difficult Conditions", CIM Bulletin, Jan. 1989, pp. unknown, vol. 82., No. 921.

Piper, et al., "An Evaluation of Heavy Oil Mining", Energy Development Consultants,, Inc. and Stone Webster Engineering Corp., Department of Energy Contract No. DE-AC03-80PC30259, Dec. 1982, pp. 1-270.

Riddell, "Oil Mining a Review of Projects", Jun. 1984, pp. 1-32.

Riddell, et al., "Heavy Oil Mining Technical and Economic Analysis", Presented at California Regional Meeting of the Society of Petroleum Engineers, Long Beach, CA Apr. 11-13, 1984, pp. 1-24.

Sahni, et al., "Electromagnetic Heating Methods for Heavy Oil Reservoirs", Submitted to 2000 Society of Petroleum Engineers, SPE/AAPG Western Regional Meeting, May 1, 2000, Long Beach, CA, pp. 1-12.

Stephenson et al., "Mining Aspects of Hard to Access Oil Sands Deposits", Norwest Corporation, Mar. 2, 2006, pp. 1-57.

Background for the above captioned case (previously provided).

Schmidt, "What's new in production", World Oil, Oct. 2006, vol. 227, No. 10, p. 14, available at http://web.ebscohost.com.proxy.bib.uottawa.ca/ehost/delivery?vid=4&hid=105&sid=3ab.., accessed Jul. 16, 2009, pp. 1-3.

* cited by examiner

METHOD OF MANAGING CARBON REDUCTION FOR HYDROCARBON PRODUCERS

CROSS REFERENCE TO RELATED APPLICATION

The present application claims the benefits, under 35 U.S.C. §119(e), of U.S. Provisional Application Ser. No. 61/054,727 filed May 20, 2008, entitled "Method of Managing Carbon Dioxide Emissions for Hydrocarbon Producers" to Gil and Squires, which is incorporated herein by this reference.

FIELD

The present invention relates generally to processing hydrocarbons and specifically to processing hydrocarbons with controlled carbon emissions.

BACKGROUND

There are many hydrocarbon producing regions around the world. These regions may produce hydrocarbons by conventional means or by non-conventional means as production from conventional sources declines. For example, conventional means include mining coal, drilling wells and pumping crude oil or natural gas to the surface. Non-conventional means include, for example, recovering bitumen and heavy oil by thermal stimulation or mining, biomass production and the like. In all instances, the producing regions are large producers of fossil and non-fossil carbon fuels, which when burned, emit carbon dioxide which is becoming more and more regulated as the link between carbon dioxide emissions and global warming becomes understood.

A prime example of such a producing region is the Western Canadian Sedimentary Basin which contains immense reserves of unconventional hydrocarbons (principally in the form of bitumen and heavy oil) as well as large reserves of conventional oil & gas, coal and abundant biomass.

These producing regions are increasingly coming under regulatory pressures to reduce emissions of carbon dioxide, especially fossil carbon dioxide, wherein each producer may be regulated by a carbon accounting system. For example, a producer may be given the choice of physically reducing their carbon dioxide emissions, purchasing a carbon credit in a cap and trade system, paying a carbon tax in a carbon tax system or some combination of each. For example, a producer may choose to reduce their fossil carbon dioxide emissions by installing on-site carbon capture and sequestration facilities. In the case of many producers, purchasing or earning a carbon credit or paying a carbon tax may be a less costly and, in the short term, a less risky course of action than installing an on-site carbon capture and sequestration facility.

Ultimately, all the producers in a producing region must act together to effect a real and significant reduction of carbon dioxide emissions. Otherwise, acquiring a carbon credit or paying a carbon tax can become prohibitively expensive over time for producers especially small producers who cannot afford to reduce their carbon dioxide emissions by installing on-site carbon capture and sequestration facilities.

There remains, therefore, a need for alternative methods of managing the reduction of carbon dioxide in a producing region that can provide an alternative to such carbon accounting strategies as acquiring a carbon credit, paying a carbon tax or installing on-site capture and sequestration facilities.

SUMMARY

These and other needs are addressed by the present invention. The various embodiments and configurations of the present invention are directed generally to a method and means of managing the reduction of carbon from hydrocarbon products from a large number of hydrocarbon producers within a given geographic region during transport of the product from its source of recovery to the market. This removed carbon may be disposed of by, for example, sequestering carbon dioxide generated during the carbon removal process.

In a first embodiment, a method includes the steps:
(a) receiving, in a main hydrocarbon delivery system, a hydrocarbon product of a first producer, the main hydrocarbon delivery system also carrying a hydrocarbon product of other producers;
(b) removing at least a portion of the hydrocarbon product of the first producer from the main hydrocarbon delivery system;
(c) removing an amount of carbon from the at least a portion of the hydrocarbon product thereby creating an altered product;
(d) accounting for the amount of carbon removed from the at least a portion of the hydrocarbon product; and
(e) providing the altered hydrocarbon product back to the main hydrocarbon delivery system.

In a second embodiment, a method includes the steps:
(a) determining, with one or more volumetric sensors, that an amount of hydrocarbon product of a first producer has been removed from a main hydrocarbon delivery system, wherein the main hydrocarbon delivery system also carries a hydrocarbon product of a second producer;
(b) determining, by computer, an amount of carbon that has been removed from the hydrocarbon product of the first producer;
(c) accounting, by computer, for the amount of carbon removed from the hydrocarbon product of the first producer;
(d) generating, by computer, a report representative of the amount of carbon that has been removed from the hydrocarbon product of the first producer; and
(e) providing, by computer, the report to the first producer.

In a third embodiment, a hydrocarbon processing system includes:
(a) a hydrocarbon product input connected to a main hydrocarbon transport means, wherein the main hydrocarbon transport means carries hydrocarbon products from at least a first and second hydrocarbon producer;
(b) a process facility connected to the hydrocarbon product input, the process facility adapted to process a hydrocarbon product of the first hydrocarbon producer and remove at least some carbon from the hydrocarbon product of the first hydrocarbon producer; and
(c) an accounting system adapted to determine an amount of carbon removed from the hydrocarbon product of the first hydrocarbon producer and generating a report representative of the amount of carbon that has been removed from the hydrocarbon product of the first producer.

In a fourth embodiment, a method includes the steps:
(a) receiving, at a processing plant, a hydrocarbon-containing material;
(b) converting, by the processing plant, at least some of the carbon content of the hydrocarbon into carbon monoxide and/or dioxide to form a product gas comprising produced hydrocarbons and carbon monoxide and/or dioxide;

(c) separating, by the processing plant, at least most of the carbon monoxide and/or dioxide from at least most of the produced hydrocarbons;

(d) sequestering, by the processing plant, the separated carbon monoxide and/or dioxide; and (e) determining, by a computer, a carbon credit or tax benefit as a function of the amount of the sequestered separated carbon monoxide and/or dioxide.

The various embodiments can have advantages relative to conventional operations. By way of example, the embodiments can provide a cost-effective way to comply with regulatory requirements to reduce emissions of carbon dioxide, especially fossil carbon dioxide. The embodiments facilitate cooperative action by producers in a producing region to effect a real and significant reduction of carbon dioxide emissions. This can maintain the cost of acquiring carbon credits or paying carbon taxes or both at reasonable levels, thereby avoiding significant consumer price increases in fossil fuels. The embodiments can provide a new alternative to producers for carbon accounting such as purchasing or trading a carbon credit, paying a carbon tax or other tax or installing, by producers, on-site capture and sequestration facilities.

The following definitions are used herein:

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Accounting as used herein means all transactions relating to tracking hydrocarbon products and to all physical and financial transactions involving the hydrocarbon product and its alterations. In general, accounting is the practice concerned with (1) methods for recording transactions, (2) keeping financial records, (3) performing internal audits, (4) reporting and analyzing financial information to the service provider, client and, if necessary, the appropriate government agency, and (5) advising on taxation matters. It is a systematic process of identifying, recording, measuring, classifying, verifying, summarizing, interpreting and communicating financial information for products and services.

Automatic and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Carbon accounting means any prevailing system of accounting for carbon content and its associated emissions. Examples of carbon accounting systems are the cap and trade system or a carbon tax imposed on carbon or carbon dioxide emitters.

Carbon cap and trade means a system of emissions control whereby a cap is put on the total amount of a certain type of emissions such as for example carbon dioxide. Emitters within the system may trade emissions credits amongst each other so long as the total emissions remain under the cap. For example, an emitter who emits less than their allotted amount of emissions can sell his shortfall in the form of a carbon credit to an emitter who has exceeded his allotted emissions. A cap and trade system can operate as a stand alone system of emission control or it can be combined with other carbon control systems such as, for example, a carbon tax system.

Carbon credits are a component of national and international attempts to mitigate the growth in concentrations of greenhouse gases. For example, carbon dioxide emissions are capped and then markets are used to allocate the emissions among the group of regulated sources. Since carbon mitigation projects generate credits, this approach can be used to finance carbon reduction schemes between trading partners around the world. There are also many companies that sell carbon credits to commercial and individual customers. These carbon offsetters purchase the credits from an investment fund or a carbon development company that has aggregated the credits from individual projects. Burning of fossil fuels is a major source of industrial carbon and other greenhouse gas emissions, especially for power, cement, steel, textile, fertilizer and many other industries which rely on fossil fuels (for example electricity derived from coal, natural gas, oil and the like). The major greenhouse gases emitted by these industries are carbon dioxide, methane, nitrous oxide, hydrofluorocarbons and the like. The concept of carbon credits was formalized in the Kyoto Protocol, an international agreement between more than 170 countries, and the market mechanisms were agreed through the subsequent Marrakesh Accords. The Protocol agreed caps or quotas on the maximum amount of greenhouse gases for developed and developing countries. In turn these countries set quotas on the emissions of installations run by local business and other organizations, generically termed operators. Countries manage this through their own national registries, which are required to be validated and monitored for compliance by the UNFCCC. Each operator has an allowance of credits, where each unit gives the owner the right to emit one metric tonne of carbon dioxide or other equivalent greenhouse gas. Operators that have not used up their quotas can sell their unused allowances as carbon credits, while businesses that are about to exceed their quotas can buy the extra allowances as credits, privately or on the open market. By permitting allowances to be bought and sold, an operator can seek out the most cost-effective way of reducing its emissions, either by investing in cleaner machinery and practices or by purchasing emissions from another operator who already has excess capacity.

A carbon sequestration facility is a facility in which carbon dioxide can be controlled and sequestered in a repository such as, for example, by introduction into a mature or depleted oil and gas reservoir, an unmineable coal seam, a deep saline formation, a basalt formation, a shale formation, or an excavated tunnel or cavern.

Carbon tax means a tax imposed on carbon emissions by an approved regulatory agency such as a government or a private agency approved and overseen by a government.

Computer-readable medium as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

Determine, calculate and compute and variations thereof, as used herein, are used interchangeably and include any type of methodology, process, mathematical operation or technique.

Dilbit is short for diluted bitumen. Typically, dilbit is about 65% bitumen diluted with about 35% naphtha. The naphtha is added to make a fluid that can be transported by pipeline by reducing the viscosity of the bitumen/naphtha mixture. The dilbit can be transported by pipeline to a refinery. The naphtha diluent can be taken out as a straight run naphtha/gasoline and reused as diluent. Or it is processed to products in the refinery. The dilbit has a lot of light hydrocarbons from the diluent and a lot of heavy hydrocarbons from the bitumen. So it is a challenge to process directly in a normal refinery. Dilbit can only be a small part of a normal refinery's total crude slate. In addition to naphtha, condensate can also be used as diluent.

A hydrocarbon transport means as used herein includes any means of bulk hydrocarbon transport including but not limited to a pipeline, a train of tank cars or gondolas, a ship, a barge or a truck convoy.

A sequestration hub as used herein is a location where a substantial carbon dioxide sequestration facility is located and where at least one major hydrocarbon transport means (e.g., a pipeline or other conduit, train, tanker car, tanker truck, barge, seagoing tanker vessel, or other hydrocarbon carrier) passes nearby.

A logistics hub as used in pipeline transport is a location that serves as gateways for regional supply. These are characterized by interconnections among many pipelines and, often, other modes of transportation—such as tankers and barges, sometimes rail, and usually trucks, especially for local transport—that allow supply to move from system-to-system across counties, states, and regions in a hub-to-hub progression. These hubs are also characterized by their substantial storage capacity. The availability of storage and transportation options at these hubs enhances supply opportunities and increases supply flexibility, both essential ingredients for an efficient market.

Module or agent as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

A mobilized hydrocarbon is a hydrocarbon that has been made flowable by some means. For example, some heavy oils and bitumen may be mobilized by heating them or mixing them with a diluent to reduce their viscosities and allowing them to flow under the prevailing drive pressure. Most liquid hydrocarbons may be mobilized by increasing the drive pressure on them, for example by water or gas floods, so that they can overcome interfacial and/or surface tensions and begin to flow.

An oleofinic hydrocarbon is a saturated hydrocarbon made from any of a series of unsaturated open-chain hydrocarbons corresponding in composition to the general formula $C_nH_{2n}$. An example is benzene $C_6H_6$. Olefins containing two to four carbon atoms per molecule are gaseous at ordinary temperatures and pressure; those containing five or more carbon atoms are usually liquid at ordinary temperatures. Olefins are only slightly soluble in water. Ethylene, $C_2H_2$, is the smallest olefin. Significant fractions are found in crude oil.

A paraffinic hydrocarbon is saturated hydrocarbon and is the common name for the alkane hydrocarbons with the general formula $C_nH_{2n}$. The simplest paraffin molecule is that of methane, $CH_4$. Paraffin wax refers to the solids with n=20 to 40. Heavier members of the series, such as that of octane $C_8H_{18}$, appear as liquids at room temperature. The solid forms of paraffin, called paraffin wax, are from the heaviest molecules from $C_{20}H_{42}$ to $C_{40}H_{82}$. Paraffin, or paraffin hydrocarbon, is also the technical name for an alkane in general, but in most cases it refers specifically to a linear, or normal alkane—whereas branched, or isoalkanes are also called isoparaffins. Typically the largest fraction found in crude oil.

Petroleum coke or pet coke is a fuel produced using the byproducts of the petroleum refining process. When crude oil is refined to produce gasoline and other products, a residue is left over from this process that can be further refined by "coking" it at high temperatures and under great pressure. The resulting product is pet coke, a hard substance that is similar to coal. Pet coke has a higher heating value than coal, at around 14,000 Btu per pound, compared with 12,500 BTU per pound for coal.

Primary production or recovery is the first stage of hydrocarbon production, in which natural reservoir energy, such as gas-drive, water-drive or gravity drainage, displaces hydrocarbons from the reservoir, into the wellbore and up to surface. Production using an artificial lift system, such as a rod pump, an electrical submersible pump or a gas-lift installation is considered primary recovery. Secondary production or recovery methods frequently involve an artificial-lift system and/or reservoir injection for pressure maintenance. The purpose of secondary recovery is to maintain reservoir pressure and to displace hydrocarbons toward the wellbore. Tertiary production or recovery is the third stage of hydrocarbon production during which sophisticated techniques that alter the original properties of the oil are used. Enhanced oil recovery can begin after a secondary recovery process or at any time during the productive life of an oil reservoir. Its purpose is not only to restore formation pressure, but also to improve oil displacement or fluid flow in the reservoir. The three major types of enhanced oil recovery operations are chemical flooding, miscible displacement and thermal recovery.

A producer is a any producer of natural gas, oil, heavy oil, bitumen, peat, biomass or coal from a hydrocarbon reservoir.

A producing region as used herein is a region, defined by natural or imposed boundaries, in which there are numerous producers and in which there is at least one major carbon dioxide sequestration facility.

Reforming means fossil fuel reforming which is a method of producing useful products, such as hydrogen or ethylene from fossil fuels. Fossil fuel reforming is done through a fossil fuel processor or reformer. At present, the most common fossil fuel processor is a steam reformer. This conversion is possible as hydrocarbons contain much hydrogen. The most commonly used fossil fuels for reforming today are methanol and natural gas, yet it is possible to reform other fuels such as propane, gasoline, autogas, diesel fuel, methanol and ethanol. During the conversion, the leftover carbon dioxide is typically released into the atmosphere. On an industrial scale, reforming is the dominant method for producing hydrogen. The basic chemical reaction for reforming is:

$$C_nH_m + nH_2O \rightarrow nCO + (m/2+n)H_2$$

This reaction is endothermic. The produced carbon monoxide can combine with more steam to produce further hydrogen via the water gas shift reaction.

A report producing device as used herein is any device or collection of devices adapted to automatically and/or mechanically produce a report. As one example, a report producing device may include a general processing unit and memory (likely residing on a personal computer, laptop, server, or the like) that is adapted to generate a report in electronic format. The report producing device may also comprise a printer that is capable of generating a paper report based on an electronic version of a report.

Synbit is a blend of bitumen and synthetic crude. Synthetic crude is a crude oil product produced, for example, by the upgrading and refining of bitumen or heavy oil. Typically, synbit is about 50% bitumen diluted with about 50% synthetic crude.

Syngas (from synthesis gas) is the name given to a gas mixture that contains varying amounts of carbon monoxide and hydrogen. Examples of production methods include steam reforming of natural gas or liquid hydrocarbons to produce hydrogen, the gasification of coal and in some types of waste-to-energy gasification facilities. The name comes from their use as intermediates in creating synthetic natural gas and for producing ammonia or methanol. Syngas is also used as an intermediate in producing synthetic petroleum for use as a fuel or lubricant via Fischer-Tropsch synthesis and previously the Mobil methanol to gasoline process. Syngas consists primarily of hydrogen, carbon monoxide, and very often some carbon dioxide, and has less than half the energy density of natural gas. Syngas is combustible and often used as a fuel source or as an intermediate for the production of other chemicals.

The Texaco Gasification Process ("TGP") is a technology for the conversion of heavy oils, petroleum coke, and other heavy petroleum streams, to valuable products. The TGP allows conversion of hydrocarbons, including asphaltenes, into synthesis gas that consists primarily of hydrogen, carbon monoxide, carbon dioxide, and water. The Texaco Gasification Power System technology combines the TGP with combined-cycle power and co-generation technology to produce steam and power. The Texaco Hydrogen Generation Process combines TGP technology with that of hydrogen production. The syngas may also be used as a precursor of other varied chemicals such as methanol, ammonia, and oxo-chemicals.

Upgrading (including partial upgrading) as used herein means removing carbon atoms from a hydrocarbon fuel, replacing the removed carbon atoms with hydrogen atoms to produce an upgraded fuel and then combining the carbon atoms with oxygen atoms to form carbon dioxide.

It is to be understood that a reference to diluent herein is intended to include solvents.

It is to be understood that a reference to oil herein is intended to include low API hydrocarbons such as bitumen (API less than ~10°) and heavy crude oils (API from ~10° to ~20°) as well as higher API hydrocarbons such as medium crude oils (API from ~20° to ~35°) and light crude oils (API higher than ~35°). A reference to bitumen is also taken to mean a reference to low API heavy oils.

DETAILED DESCRIPTION

Overview

This disclosure relates generally to a method and means of managing the reduction of carbon during product transport for a large number of hydrocarbon fuel producers within a given geographic region. This reduction of carbon, in which the carbon is typically eventually transformed into carbon dioxide and carbon monoxide, dioxide is accomplished at a few major sequestration hubs located within the geographic region where the sequestration hubs themselves pass through or near major carbon dioxide sequestration facilities.

Figure 1:
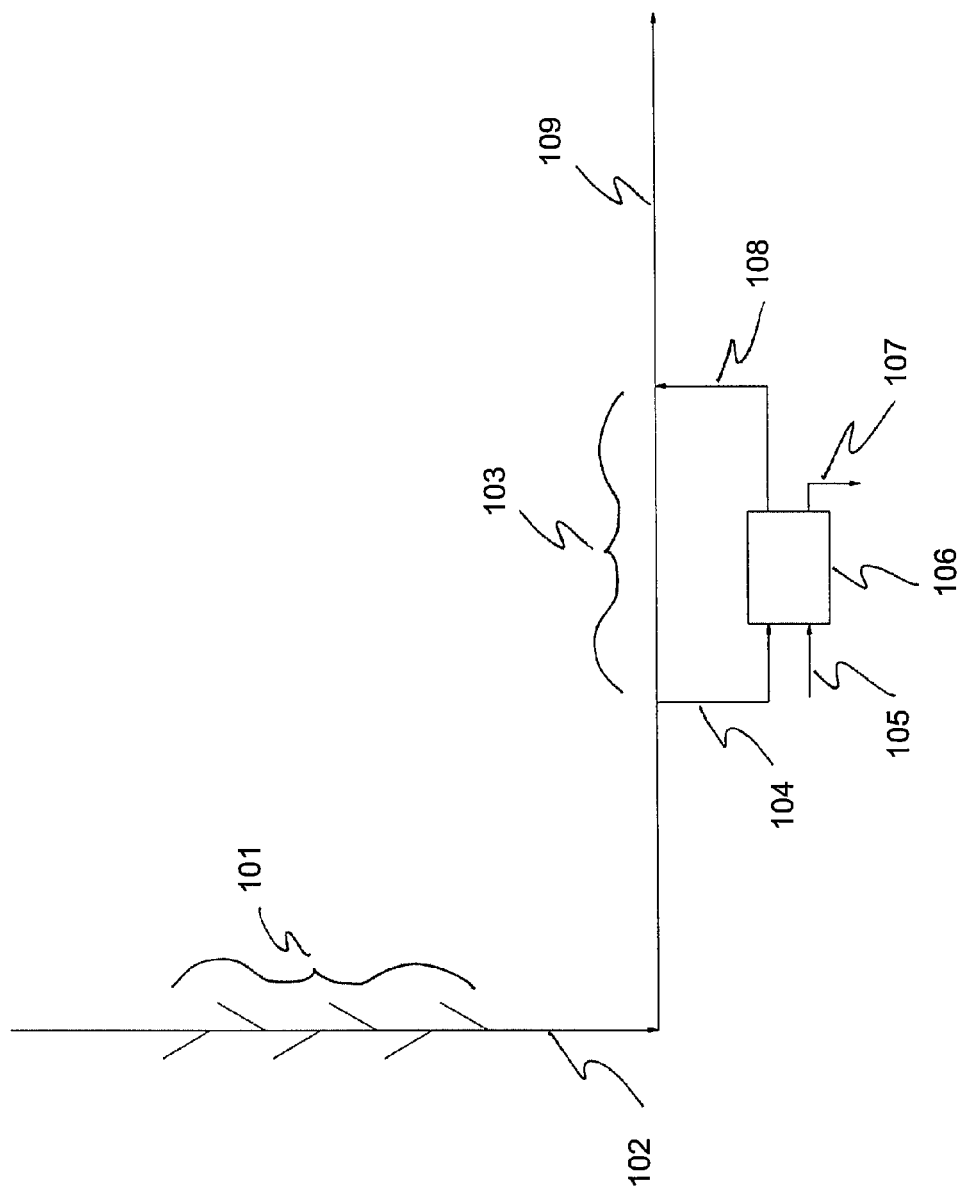
FIG. 1 is a schematic of the general overall flow process of the present invention.

In general, the method disclosed herein is based on:
1. removing a portion of product from a major hydrocarbon transport means as it passes near or through major a carbon or carbon dioxide sequestration facility (sequestration hub)
2. Performing a process on the portion of product in which carbon or carbon dioxide is produced and separated
3. capturing and sequestering the carbon and/or carbon dioxide
4. if, necessary further processing the removed portion to produce a hydrocarbon product compatible with the original hydrocarbon product in the hydrocarbon transport means
5. returning the new hydrocarbon product to the hydrocarbon transport means
6. accounting for the change in product and product value as well as for the carbon credits accrued and/or carbon tax benefits realized for each producer's share of the original hydrocarbon product This general method is illustrated in FIG. 1. Here a number of small feeder lines 101 are collected into a main transport means 102. When the main transport means 102 passes near or through a carbon sequestration hub 103, a portion 104 of the product in the main line is removed and sent to a process facility 106. In addition to the portion 104, other fuels and energy 105 may be input to the processing facility 106. In the processing facility 106, carbon dioxide and/or carbon are produced, captured and removed from the input portion and sequestered 107. A processed portion 108, now minus some carbon and/or carbon dioxide, is then returned to the main line 109 where it is transported to a refinery or other destination.

The process facility 106 may incorporate any number of well-known processes to produce, capture and remove carbon dioxide and/or carbon from the input portion. These include processes used to produce synthetic fuels, processes to upgrade hydrocarbons, processes used to refine hydrocarbons and other processes such as disclosed in U.S. patent application Ser. No. 12/237,163 filed Sep. 24, 2008 entitled "Method of Upgrading Bitumen and Heavy Oil", to Gil which is incorporated herein by this reference. This invention is directed to separating a hydrocarbon feed-stock such as bitumen or heavy oil, into a de-asphalted oil component and a residue component comprising primarily asphaltenes. The asphaltenes with some added bitumen are converted by a plasma arc reactor into a controllable mixture of primarily paraffins and impurities. Natural gas liquids are separated out by refrigeration. The lighter paraffins may be used to operate a steam or gas turbine to produce electrical energy which, in turn, may be used to provide power for generating steam, for powering the plasma arc reactor and other apparatuses of an on-site processing plant or excess power may be sold to the grid. Another such process is disclosed in U.S. patent application Ser. No. 12/255,503 filed Oct. 21, 2008 entitled "Method of Removing Carbon Dioxide Emissions from In-situ Recovery of Bitumen and Heavy Oil", to Gil which is incorporated herein by this reference. This invention, in one configuration, is directed to producing a methane-containing gas from a hydrocarbon fuel energy source extracted from an in-situ recovery operation, such as a SAGD or HAGD operation, and subsequently converting at least a portion of the gas into steam, electrical power and diluents for subsequent use in the aforementioned in-situ recovery operation while emitting only controlled amounts of carbon dioxide into the environment.

The process can be applied to any hydrocarbon product at a carbon sequestration hub wherein a portion of product from the hydrocarbon transport means is removed and processed by all or part of any of several well-known hydrocarbon reforming, upgrading or refining processes to capture and sequester some carbon and/or carbon dioxide. When coupled to an appropriate accounting system, this provides another way to account for reducing carbon emissions for any hydrocarbon feedstock which passes near or through a carbon sequestration facility on its way to a final destination such as a refinery.

The above process, which removes and accounts for a portion of fossil or non-fossil carbon, provides an alternative to the producer for dealing with carbon emissions. In addition to (1) installing on-site carbon capture and sequestration capability or (2) purchasing or trading a carbon credit or (3) paying a carbon tax or obtaining another form of tax benefit, the producer can (4) invest in or pay an amount less than the carbon credit or carbon tax to an reforming or upgrading facility located at or near a sequestration hub.

General Method

One general method described herein involves removing a portion of product from a hydrocarbon transport means as it passes near or through a carbon and/or carbon dioxide sequestration facility. The portion is then treated as a feedstock for a synthetic fuel plant which consists of at least converting the feedstock to syngas by a gasification process, water-shift conversion of the carbon monoxide to carbon dioxide, capturing and sequestering the carbon dioxide and residual carbon. In the case of natural gas feedstock, the remaining methane and hydrogen can be returned to the hydrocarbon transport means. In the case of other feedstocks (crude oil, heavy crude oil, bitumen, dilbit, petcoke, biomass, and coal), the portion now minus its carbon dioxide and other carbon residuals can be further processed by a fuel synthesis step (such as Fischer Tropsch, Bergius, Mobil or Karrick processes for example) to produce a distribution of unbranched paraffinic and olefinic hydrocarbons. If compatible with the original hydrocarbon product in the hydrocarbon transport means, these can be returned to the hydrocarbon transport means. Otherwise, the portion can be processed even further by hydroprocessing the fuel synthesis products to produce a final product slate compatible with the original hydrocarbon product and then returned to the hydrocarbon transport means.

Natural Gas

Figure 2:
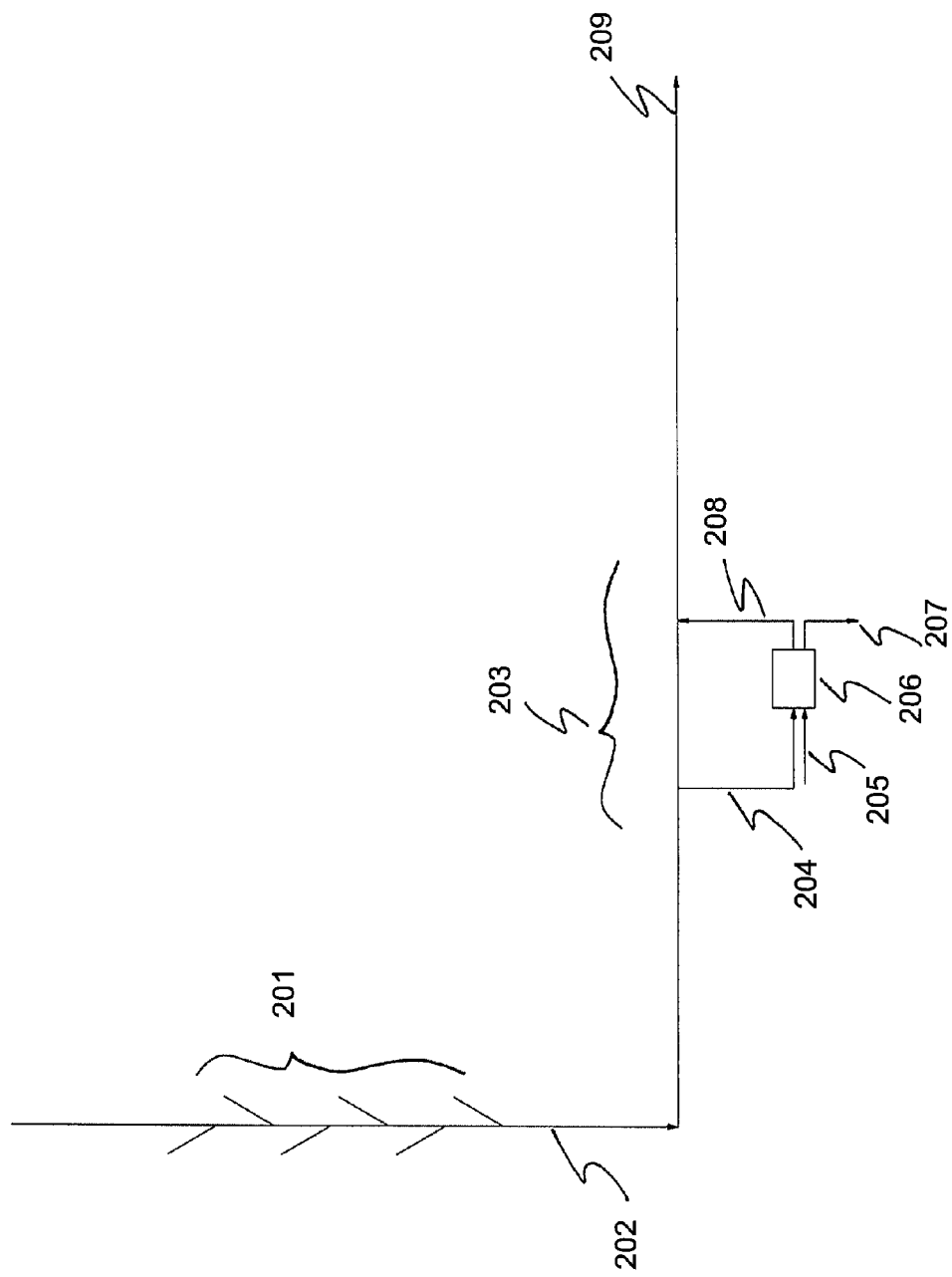
FIG. 2 is a schematic of an example flow process of the present invention suitable for a feedstock of natural gas.

FIG. 2 is a schematic of an example flow process of the present invention suitable for a feedstock of natural gas. This is an example of a method that involves removing or slip-streaming out, a portion of natural gas from a natural gas transport means (such as, for example, a compressed natural gas ("CNG") pipeline or a liquified natural gas ("LNG") pipeline) as it passes near or through a carbon or carbon dioxide sequestration facility. The portion is then used as a feedstock for a gas reforming plant in which the portion of natural gas is converted to syngas, the carbon monoxide component of the syngas is converted to carbon dioxide by the well-known water shift process and the resulting carbon dioxide is captured and sequestered. The remaining methane and hydrogen can be returned to the natural gas transport means.

Since steam is added to the natural gas in the reforming process, for every molecule of carbon dioxide created, captured and sequestered, approximately four molecules of hydrogen gas are available to be added back to the natural gas remaining in the main natural gas transport means. In other words, a fraction of fossil carbon originally in the portion of natural gas removed is captured and sequestered. The principal reactions by which methane is reformed are:

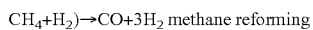

$CH_4+H_2O \rightarrow CO+3H_2$ methane reforming

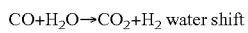

$CO+H_2O \rightarrow CO_2+H_2$ water shift

This method is illustrated in FIG. 2. Here a number of small gas feeder lines 201 are collected into a main gas transport means 202. When the main gas transport means 202 passes near or through a carbon sequestration hub 203, a portion 204 of the natural gas-containing product in the main line is removed and sent to a reformer facility 206. As will be appreciated, a typical natural gas-containing product contains from about 50 to about 98 mole percent methane, from about 1 to about 15 mole percent ethane, and up to about 5 mole percent propane and butane. The product may contain various sulfur, nitrogen and carbon dioxide compounds as contaminants. In addition to the removed portion 204, steam and energy 205 are input to the reforming facility 206. In the reforming facility 206, carbon monoxide is produced, by known techniques, primarily from methane. Preferably, most, more preferably 75% or more, and even more preferably 95% or more of the carbon monoxide is converted into carbon dioxide by the water shift reaction. Preferably, most, more preferably 75% or more, and even more preferably 95% or more of the carbon dioxide is, captured and removed by known techniques (such as the chilled alcohol process) from the reformed gas, and sequestered 207. The carbon in the sequestered gas is typically most, more typically 75% or more, and even more typically 85% or more of the carbon content of the removed portion 204. A remaining portion 208 consisting principally of molecular hydrogen is then returned to the main line 209 where it is transported to a final destination. As can be appreciated, all or a part of the molecular hydrogen can be returned to the main line 209. A part of the molecular hydrogen may also be used as fuel to power the reforming facility 203.

In the above example, the portion of natural gas removed from a natural gas transport means is in the range of about 5% to about 20% by volume of the initial amount of gas in the transport means prior to arrival at the sequestration hub.

For the above example, the disclosure includes a means of accounting, valuing and processing the removed portion of gas, the value added by reforming and the amount of carbon and carbon dioxide sequestered. The amount and composition of gas in the main gas transport means prior to arrival at a sequestration hub are determined by the operator of the gas transport means as the individual products are added to the gas transport means. The portion of gas removed from the gas transport means at the sequestration hub is known by measurement. The effects of the reforming process processes are well-known and can be quantified. Therefore the amount of carbon and carbon dioxide removed for each gas producer can be determined and applied pro rata to each producers portion. In addition, since the current value of each product resulting from the reforming process is known, the pro rata value added for each producer by the products added back into the gas transport means can also be determined. This provides the basis for accounting for the carbon credits or carbon tax benefits and value added for each producer contributing to the gas in the gas transport means prior to arrival at a sequestration hub.

The disclosure, which is a means of removing and accounting for a portion of fossil or non-fossil carbon, provides another way to account for reducing carbon emissions to the producer for dealing with carbon credit or tax issues. In addition to (1) installing on-site carbon capture and sequestration capability or (2) acquiring a carbon credit or (3) incurring a carbon tax liability, the producer can (4) invest in or pay an amount less than the carbon credit or carbon tax to an reforming or upgrading facility located at or near a sequestration hub.

Bitumen

Figure 3:
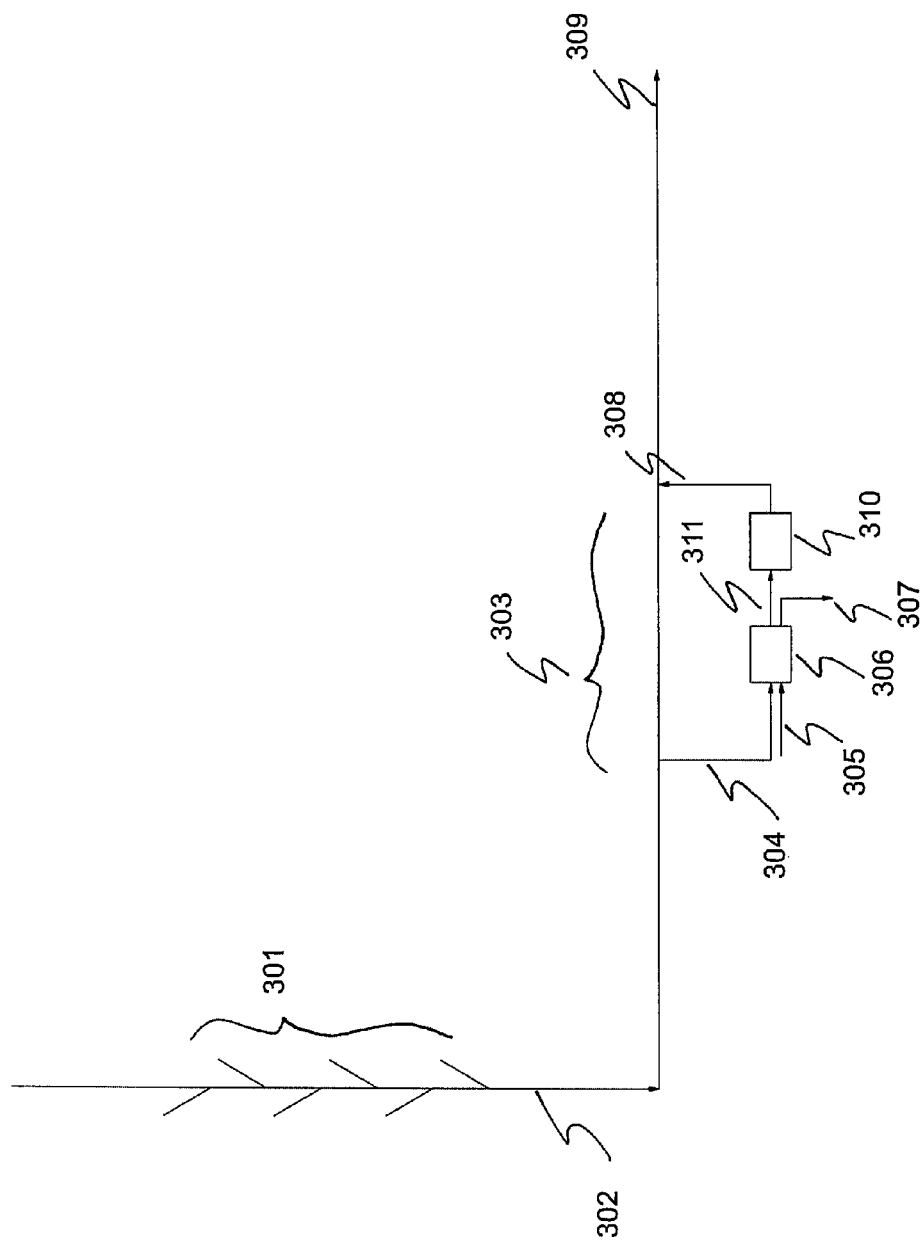
FIG. 3 is a schematic of an example flow process of the present invention suitable for a feedstock of bitumen, biomass or coal.

FIG. 3 is a schematic of an example flow process according to an embodiment of the present invention suitable for a feedstock of bitumen/diluent ("dilbit"). As will be appreciated, dilbit is a blend of bitumen and naphtha. This process may, of course, be applied by synbit (which is a blend of bitumen and synthetic crude). FIG. 3 is an example of a method that removes a portion of dilbit from a dilbit transport means (such as, for example, a bitumen pipeline or a bitumen train) as it passes near or through a carbon or carbon dioxide sequestration facility. The portion is then used as a feedstock for the first two steps of a well-known three-step synthetic fuel process. In the first step, syngas is produced by any well-known gasification process. The carbon monoxide component of the syngas is converted to carbon dioxide by the well-known water shift process and the resulting carbon dioxide is captured and sequestered. In the second step, the syngas minus its carbon monoxide component is then treated by a process such as, for example, the Fischer Tropsch process to produce medium to heavy unbranched paraffinic and olefinic hydrocarbons. These are added back into the main dilbit transport means. In this way, a portion of fossil carbon related to the portion of dilbit removed is captured and sequestered. As can be appreciated, some of the hydrogen produced may be used to produce power for the synthetic fuel plant.

In the above example, the portion of dilbit removed from a dilbit transport means is in the range of about 5% to about 50% by volume of the initial amount of dilbit in the transport means prior to arrival at the carbon sequestration hub.

This method is illustrated in FIG. 3. Here a number of small bitumen feeder lines 301 are collected into a main bitumen transport means 302. When the bitumen transport means 302 passes near or through a carbon sequestration hub 303, a portion 304 of the dilbit in the main line is removed and sent to a synthetic fuel processing facility 306. In addition to the removed portion 304, steam (or oxygen or air) and energy 305 are input to the processing facility 306. In the processing facility 306, syngas is produced. As will be appreciated, syngas is a mixture of carbon monoxide, molecular hydrogen, water vapor, carbon dioxide, methane, and nitrogen. The precise concentrations of the components depends on the particular gasification process employed. Using the water-gas shift process, preferably most, even more preferably 75% or more, and even more preferably 95% or more of the carbon monoxide is converted into carbon dioxide. Typically, most, more typically 75% or more, and even more typically 90% or more of the carbon dioxide is captured and removed from the gaseous product of gasification and sequestered 307. The removed carbon commonly is most, more commonly 60% or more, and even more commonly 65% or more of the carbon content of the removed portion 304. The remaining portion of the gaseous product consists principally of methane, molecular hydrogen and asphaltene residues is then sent 311 to a second process step 310 (such as, for example, the Fischer Tropsch process) to produce medium to heavy unbranched paraffinic and olefinic hydrocarbons. These are added back 308 into the main dilbit transport means 309 where it is transported to a refinery or other destination. As can be appreciated, all or a part of the molecular hydrogen from the sygas step 306 can be sent to the next process step 310. All or a part part of the molecular hydrogen may also be used as fuel to power the gasification facility 306.

In the gasification step, asphaltenes which are carbon-rich are produced as a residue. These asphaltenes may be used as road bed material (a form of sequestration), they may be buried if there value as a carbon credit outweighs there value as a low-grade fuel or they may be used as a low grade fuel (where its combustion characteristics can be improved by the addition of dilbit) to provide additional on-site power. If used in this latter role, any carbon dioxide generated, can be captured by any of several well-known means and sequestered, thereby adding to the carbon credits and/or carbon tax benefits effected by the overall process.

Another option is to process the portion of dilbit removed from a dilbit transport means by solvent deasphalting. This process produces deasphalted oil ("DAO") and asphaltenes. The DAO can be added back into the dilbit transport means. The asphaltenes which, being very carbon rich and of low heat value, may sequestered or further processed by a gasifier to produce syngas from which carbon dioxide can be recovered and sequestered.

Crude Oil

Figure 4:
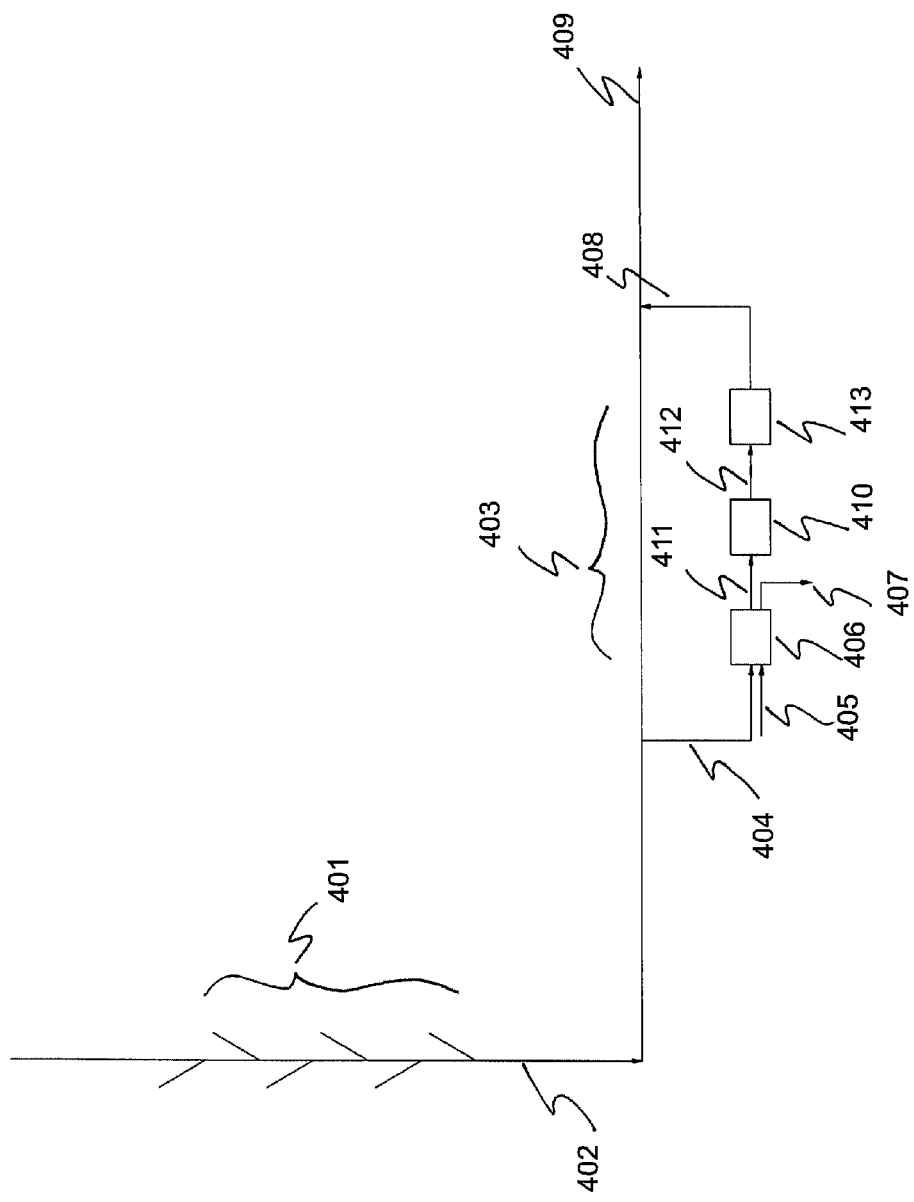
FIG. 4 is a schematic of an example flow process of the present invention suitable for a feedstock of crude oil.

FIG. 4 is a schematic of an example flow process according to an embodiment of the present invention that is suitable for a feedstock of crude oil. This is an example of a method that involves removing a portion of crude oil from a crude oil transport means (such as, for example, a crude oil pipeline or an oil train) as it passes near or through a carbon or carbon dioxide sequestration facility. The removed portion is then used as a feedstock for the all three steps of a well-known synthetic fuel process. In the first step, syngas is produced by any well-known gasification process. The carbon monoxide component of the syngas is converted to carbon dioxide by the well-known water shift process and the resulting carbon dioxide is captured and sequestered. In the second step, the syngas minus its carbon monoxide component is then treated by a process such as, for example, the Fischer Tropsch process to produce medium to heavy unbranched paraffinic and olefinic hydrocarbons. In the third step, the output of the Fischer Tropsch stage is further processed by hydroprocessing to produce a final product slate compatible with the original hydrocarbon product (such as for example naptha, kerosene and gas oil) and then returned to the crude oil transport means. In this way, a portion of fossil carbon related to the portion of crude oil removed is captured and sequestered. As can be appreciated, some of the hydrogen produced during the gasification step may be used to produce power for the synthetic fuel plant.

This method is illustrated in FIG. 4. Here a number of small crude oil feeder lines 401 are collected into a main crude oil transport means 402. As will be appreciated, crude oil normally contains various hydrocarbon gases having from 1 to 4 carbons, light and heavy naphtha, kerosene, light and heavy gas oil, and residuum. When the crude oil transport means 402 passes near or through a carbon sequestration hub 403, a portion 404 of the crude oil in the main line is removed and sent to a synthetic fuel processing facility 406. In addition to the removed portion 404, steam (or oxygen or air) and energy 405 are input to the processing facility 406. In the processing facility 406, carbon dioxide and carbon monoxide are produced. Preferably, most of the carbon monoxide is converted into carbon dioxide using the water-gas shift reaction. Preferably, most of the carbon dioxide is captured and removed from the product gas and sequestered 407. The carbon content of the sequestered gas typically includes most of the carbon content of the removed portion 404. The remaining portion consisting of principally methane, molecular hydrogen and heavy oil residues is then sent 411 to a second process step 410 (such as, for example, the Fischer Tropsch process) to produce medium to heavy unbranched paraffinic and olefinic hydrocarbons. The medium to heavy unbranched paraffinic and olefinic hydrocarbons can be further processed by a hydroprocessing step 413 to produce a final product slate (mainly naptha, kerosene and gas oil) which is compatible with the original crude oil product and then returned 408 to the crude oil transport means 409 where it is transported to a refinery or other destination.

In the above example, the portion of crude oil removed from a crude oil transport means is in the range of about 5% to about 50% by volume of the initial amount of crude oil in the transport means prior to arrival at the carbon sequestration hub.

Accounting

Generally, the main or trunk hydrocarbon transport means operates in "fungible" mode in which the shipper receives the same quality of product that was tendered for transport, but not the same molecules.

For example, consider pipeline transport. Pipeline operators ship different petroleum products or grades of the same product in sequence through a pipeline, with each product or "batch" distinct from the preceding or following. A pipeline operating in fungible mode may also use batch sequencing, but on larger size batches. Once unrefined product (crude oil of a known grade for example) is injected and begins its journey, then another batch is injected, and then another batch is injected. A batch is a quantity of one product or grade that will be transported before the injection of a second product or grade. Each pipeline publishes its batch size based on the characteristics of its shippers and on pipe size. For a pipeline operating in fungible mode, products that meet common specifications can be mixed and sent through the pipeline together as a batch. For example, a pipeline will establish the acceptable specifications for batch of crude oil. Shippers whose crude meets that pipeline's specifications can obtain transport services for smaller volumes because their crude will be added to other crude of the same quality and grade from other shippers. As can be appreciated, a batch may consist of just one producers product or it may consist of several producers product. In either case, the product or mix of products all fall within a known range of common specifications For any of the above examples of FIGS. 2, 3 and 4, the present invention includes a means of accounting, valuing and processing a first portion of a hydrocarbon in a main hydrocarbon transport means to remove and sequester an amount of either or both elemental carbon and carbon dioxide and while returning a second portion of partially or wholly upgraded fuel to the main hydrocarbon transport means. In a bulk hydrocarbon transport means, the bulk hydrocarbon product is comprised of product from a large number of producers but where the product specifications fall within a predetermined narrow range. Thus each individual producer has a known pro rata amount of the total shipment. The portion of hydrocarbon removed from a main hydrocarbon transport means at the sequestration hub is also known by direct measurement with one or more volumetric sensors. The effects of the syngas process and/or subsequent process steps are well-known and can be quantified for each component of the original bulk hydrocarbon product (that is, the product as it was before arriving at the sequestration hub). Therefore the amount of carbon removed for each producer from the first portion of a hydrocarbon taken from the a main hydrocarbon transport means can be quantitatively determined. In addition, since the current value of each product resulting from the one or more process steps is known, the value added for each producer by the products added back into the bulk hydrocarbon transport means can also be accounted for. If some of the portion removed is converted to a form that can be used as an energy source for the process, then the pro rata amount of that energy is measurable and can be credited pro rata to each producer. This provides the basis for determining the value of carbon credits, and/or the value of any carbon tax benefits and the value added or subtracted for each producer contributing to the hydrocarbon products in the bulk hydrocarbon transport means prior to arrival at a sequestration hub. As will be appreciated, other accounting methods may be used.

Figure 5:
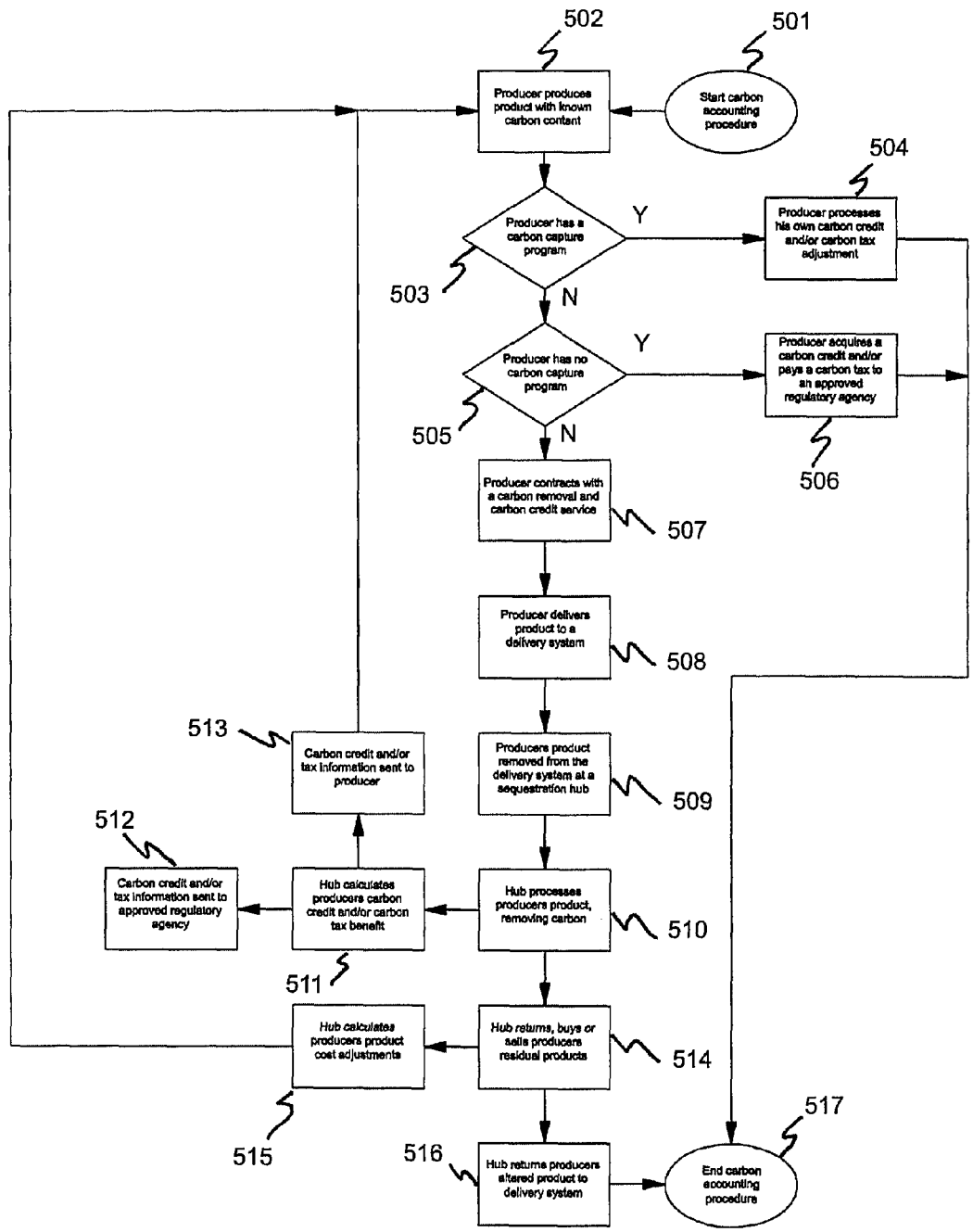
FIG. 5 is a schematic flow chart for a producer accounting for and obtaining a carbon credit or tax benefit.

FIG. 5 is a schematic flow chart for a producer accounting for and obtaining a carbon credit or tax benefit. The carbon accounting procedure starts 501. The producer produces an amount of product 502 such as for example, natural gas, heavy oil or dilbit. The producer typically knows the properties of their product such as for example its API rating and ratio of hydrogen-to-carbon. If the producer has their own internal carbon capture program 503, the producer would prepare their own carbon credit and/or tax benefit paperwork and submit it to an approved regulatory agency 504 and this would end the carbon accounting procedure 517. An approved regulatory agency may be a government agency or a private agency appointed by and overseen by a government agency. If the producer has no carbon capture program, the producer may decide to acquire a carbon credit or pay a carbon tax 505, then the producer would prepare the carbon credit and/or tax information paperwork and submit it to an approved regulatory agency 506 and this would end the carbon accounting procedure 517. If the producer does not have their own carbon capture program or if the producer does not wish to acquire a carbon credit or pay a carbon tax, then the producer may retain the services of a carbon removal and carbon tax credit service 507. In this case, the producer delivers a known amount of their product into a delivery system such as, for example, a pipeline, rail tanker car or tanker truck 508. When the product reaches a sequestration hub location, the hub operator removes an selected amount of product 509 from that delivered to the delivery system by the producer. The hub operator then processes the removed portion 510 in a way that removes a known amount of the carbon from the removed portion. The hub operator then calculates the carbon credit and/or tax benefit due the producer 511 and sends this information to the approved regulatory agency 512 and to the producer 513. In step 510, the hub operator removes carbon from the producers product, creating an altered product, and, in doing so, may generate residual products such as for example liquid petroleum gas, hydrogen, diluents and the like. The hub operator then either (1) returns this residual product to the producer; (2) uses a portion of the residual product as fuel in the hub operation then compensates the producer 515 for the use of this residual product; or (3) sells this residual product and then delivers the net proceeds of this sale to the producer 514. The hub operator then calculates any adjustments to the producers product price 515 resulting from a sale, use or return of the residual products. The sequestration hub then returns the producer's altered product, which contains a reduced amount of carbon, to the delivery system 516. This ends the carbon accounting procedure 517.

The following example illustrate this accounting for a natural gas pipeline. Suppose N moles of $CH_4$ is the original amount of gas in a pipeline and 10% is removed at a carbon sequestration hub. Then 0.1N moles of $CH_4$ are converted to 0.1N moles of $CO_2$ and 0.4N moles of $H_2$.

Suppose further that 0.3N moles of $H_2$ are diverted for use as power for the gas reforming operation and the 0.1N mole of $CO_2$ is sequestered. Then 0.1N moles of $H_2$ are returned to the gas pipeline.

Incoming gas—N moles $CH_4$ (worth Y dollars)

Removed gas—0.1N moles $CH_4$ (worth 0.1Y dollars)

Sequestered carbon dioxide—0.1N moles $CO_2$ (cost to sequester but generates a carbon credit)

Hydrogen used for power—0.3N moles $H_2$ (credit to producer against cost to sequester)

Hydrogen returned to pipeline—0.1N moles $H_2$ (worth greater than 0.1Y dollars)

Outgoing gas—N moles $CH_4$ plus 0.1N moles $H_2$ (worth greater than 0.9Y dollars)

So the producer would net a pro rata share greater than 0.9Y dollars plus a carbon credit or tax benefit minus the cost to sequester plus a credit for hydrogen used.

Figure 6:
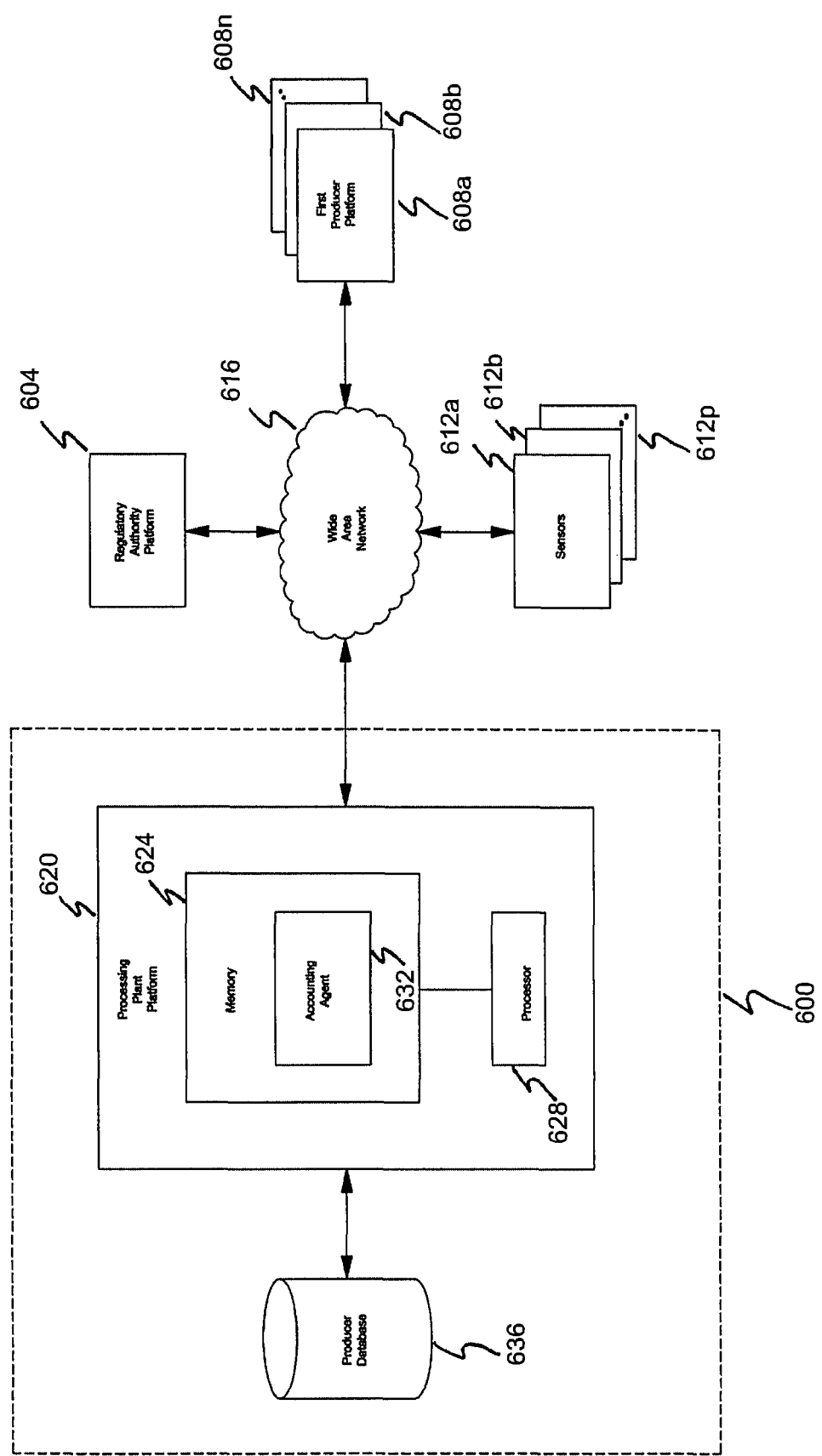
FIG. 6 is a schematic flow chart showing an automated accounting system.

Referring to FIG. 6, an automated accounting system will be discussed. The system includes a sequestration hub enterprise network 600, regulatory authority platform 604, first, second, and up to an nth producer platforms 608*a-n*, and sensors 612*a-p*, all interconnected by a Wide Area Network (WAN) 616 (such as the Internet).

The regulatory authority platform 604 is a computational system of a regulatory authority, such as a state or federal tax agency or a private approved regulatory agency, that is operable to receive carbon credit and/or tax information, including carbon tax liability and tax credit information.

The first, second, and up to the nth producer platforms 608*a-n* are computational systems of the various producers introducing hydrocarbon products into the hydrocarbon transport means (not shown). The systems are operable to provide, via WAN 616, producer information to the enterprise network 600.

The various platforms 604 and 608 can be any processor-based system, such as a mainframe, personal, laptop or notebook computer.

The sensors 612 sense and collect parameters regarding the hydrocarbon fluid in the transport means and provide, via the WAN 616, the sensed parameters to the enterprise network 600. The sensed parameters can be any suitable sensed parameter, including flow rate, flow volume, composition, specific gravity, BTU content, and the like. A sensor may be associated with a particular producer to collect information about the specific type and/or amount of hydrocarbon fluid introduced by the producer into the transport means. Exemplary sensors include flow volume rate sensors and flow hydrocarbon composition sensors.

The enterprise network 600 includes a number of sub-components. A processing plant platform (which can be, for example, a sequestration hub) 620 has a memory 624 and processor 628. Included in the memory 624 is an accounting agent to determine payment information, including carbon tax liability and credit, and report it automatically to the regulatory authority platform 604 and first, second, and up to the nth platforms 608*a-n*. A producer database 636 includes a number of profiles of each of the first, second, and up to the nth producers, including name, address, tax identifier, and the flow rate, flow volume, specific gravity, BTU content, and composition parameters, either sensed or provided by the respective producer, about the hydrocarbon fluid introduced into the transport means by the producer, pro rata or other distributions of payment, carbon tax liability, carbon tax credit, and volumes of products and byproducts produced, by the processing plant, from the producer's hydrocarbon fluid. As will be appreciated, the database and memory can be any suitable computer readable medium.

In operation, the accounting agent 632 periodically determines for the sequestration hub the various products and byproducts produced from removed portions of the hydrocarbon fluid, slurry or solid. Using the process outlined above, the agent 632 determines, based on sensed parameters, information received from the producer platforms, and sensors and other data collected in the processing plant, payment information, including available carbon credits, carbon or other tax credit and liability, for each producer introducing hydrocarbon fluids, slurries or solids into the transport means. This information is directed automatically, by the agent 632, via WAN 616 to the regulatory authority and producer platforms.

Embodiments of the present invention, which are means of removing and accounting for a portion of fossil or non-fossil carbon, provides an additional alternative to the producer for dealing with carbon accounting. In addition to (1) installing on-site carbon capture and sequestration capability or (2) paying a carbon tax or (3) acquiring or using up a carbon credit, the producer can (3) invest in or pay an amount less than the carbon credit or tax to an reforming or upgrading facility located at or near a sequestration hub.

In North America, there are a number of carbon dioxide and carbon sequestration repositories under consideration. These are:

mature or depleted oil and gas reservoirs—Mature oil and gas reservoirs consist of a layer of permeable rock with a layer of nonpermeable rock (caprock) above, such that the nonpermeable layer forms a trap that holds the hydrocarbons in place. Oil and gas fields have many characteristics that make them excellent target locations for geologic storage of CO2. The geologic conditions that trap oil and gas are also the conditions that are conducive to CO2 sequestration. Estimated capacity is 90 billion tons.

unmineable coal seams—Unmineable coal seams are too deep or too thin to be economically mined. All coals have varying amounts of methane adsorbed onto pore surfaces. Wells can be drilled into unmineable coalbeds to recover coalbed methane, dewatered and depressurized and carbon dioxide sequestered. Unmineable coal seams provide an excellent storage site for CO2 along with the additional benefit of enhanced coalbed methane. Estimated capacity is as high as 200 billion tons.

deep saline formations—Deep saline formations are layers of porous rock that are saturated with brine. They are much more extensive than coal seams or oil- and gas-bearing rock, and represent an enormous potential for CO2 storage. Estimated capacity is as high as 3,700 billion tons.

basalt formations—Basalt formations are geologic formations of solidified lava. Basalt formations have a unique chemical makeup that could potentially convert all of the injected CO2 to a solid mineral form, thus isolating it from the atmosphere permanently. Research is focused on enhancing and utilizing the mineralization reactions and increasing CO2 flow within a basalt formation.

organic rich shale formations—Shale, the most common type of sedimentary rock, is characterized by thin horizontal layers of rock with very low permeability in the vertical direction. Many shales contain 1-2 percent organic material in the form of hydrocarbons, which provides an adsorption substrate for CO2 storage similar to CO2 storage in coal seams. Research is focused on achieving economically viable CO2 injection rates, given the shales' low permeability.

excavated tunnels and caverns—large tunnels and caverns may be excavated in, for example, limestone or sandstone formations nearby hydrocarbon recovery operations or in locations nearby logistical hubs. Such excavated tunnels and caverns have the advantage of being placed where they are desired to form a sequestration facility. For example, a 15-meter diameter tunnel, 10-kilometers long could contain up to 1.5 million tons of carbon dioxide.

A number of variations and modifications of the invention can be used. As will be appreciated, it would be possible to provide for some features of the invention without providing others. For example, the method and means of the present invention may be applied to bio-fuels such as derived from corn, sugar beets, switchgrass, trees and the like so as to upgrade the bio-fuel while recovering and sequestering some amount of carbon dioxide. While this application sequesters non-fossil carbon dioxide, it creates tradeable carbon credits in addition to providing some product upgrade. The method can also be applied to coal wherein a portion of coal taken from a main coal transport means is removed and partially upgraded. In this case, nothing may be added back to the coal transport means but may be transported and sold separately. As can be appreciated, the examples of FIGS. 2, 3 and 4 are three examples of many combinations of processes used to produce synthetic fuels, processes to upgrade hydrocarbons etcetera. These processes may be applied to remove impurities such as sulphur or they may be used in simplified form to just remove carbon or carbon dioxide or both.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   receiving, in a main hydrocarbon delivery system, a hydrocarbon product of a first producer, the main hydrocarbon delivery system also carrying a hydrocarbon product of other producers;
   removing at least a portion of the hydrocarbon product of the first producer from the main hydrocarbon delivery system;
   removing an amount of carbon from the at least a portion of the hydrocarbon product thereby creating an altered product;
   at least one of sequestering the amount of carbon from the at least a portion of the hydrocarbon product and utilizing the amount of carbon from the at least a portion of the hydrocarbon product for enhanced hydrocarbon recovery operations;
   accounting, by a computer, for the amount of carbon removed from the at least a portion of the hydrocarbon product; and
   providing the altered product back to the main hydrocarbon delivery system.

2. The method of claim 1, wherein a residual product is created when the amount of carbon is removed from the at least a portion of the hydrocarbon product, the method further comprising:
   performing at least one of the following:
   (i) returning at least a portion of the residual product to the first producer;
   (ii) using at least a portion of the residual product as fuel; and
   (iii) selling at least a portion of the residual product;
   calculating a price adjustment for the first producer based on the step performed with the residual product.

3. The method of claim 2, wherein the residual product comprises at least one of liquid petroleum gas, hydrogen, and a diluent.

4. The method of claim 1, further comprising:
   calculating carbon credit and/or tax information based on the amount of carbon removed from the at least a portion of the hydrocarbon product;
   sending the carbon credit and/or tax information to the first producer; and
   sending the carbon credit and/or tax information to an approved regulatory agency.

5. The method of claim 4, further comprising:
   charging the first producer a first amount of compensation for removing the amount of carbon from the at least a portion of the hydrocarbon product, wherein the first amount of compensation is less than an amount of carbon credit and/or tax otherwise due to the approved regulatory agency from the first producer.

6. The method of claim 1, further comprising:
removing at least a portion of a hydrocarbon product of a second producer from the main hydrocarbon delivery system;
removing an amount of carbon from the at least a portion of the hydrocarbon product of the second producer thereby creating a second altered product;
accounting for the amount of carbon removed from the at least a portion of the hydrocarbon product of the second producer; and
providing the second altered product back to the main hydrocarbon delivery system.

7. The method of claim 6, further comprising:
calculating carbon credit and/or tax information based on the amount of carbon removed from the at least a portion of the hydrocarbon product of the second producer;
sending the carbon credit and/or tax information to the second producer and not the first producer; and
sending the carbon credit and/or tax information to an approved regulatory agency.

8. The method of claim 1, wherein the main hydrocarbon delivery system comprises one or more of a pipeline, rail tanker car, tanker truck, tanker barge and marine tanker.

9. The method of claim 1, wherein the hydrocarbon delivery system comprises at least one of a plurality of rail tanker cars, tanker trucks, tanker barges and marine tankers and wherein the hydrocarbon product comprises at least one of natural gas, oil, crude oil, heavy oil, peat, coal, biomass, bitumen, petcoke, synbit and dilbit.

10. The method of claim 1, wherein the carbon removed from the at least a portion of the hydrocarbon product is removed principally in the form of carbon dioxide.

11. A method, comprising:
determining, with at least one of one or more volumetric sensors and one or more mass flow sensors, that an amount of hydrocarbon product of a first producer has been removed from a main hydrocarbon delivery system, wherein the main hydrocarbon delivery system also carries a hydrocarbon product of a second producer;
determining, by computer, an amount of carbon that has been removed and at least one of sequestered and utilized for enhanced hydrocarbon recovery operations from the hydrocarbon product of the first producer;
accounting, by computer, for the amount of carbon removed and at least one of sequestered and utilized for enhanced hydrocarbon recovery operations from the hydrocarbon product of the first producer;
generating, by computer, a report representative of the amount of carbon that has been removed and at least one of sequestered and utilized for enhanced hydrocarbon recovery operations from the hydrocarbon product of the first producer; and
providing, by computer, the report to the first producer.

12. The method of claim 11, wherein at least one residual product is created when the amount of carbon is removed from the hydrocarbon product, the method further comprising:
determining that at least one of the following has occurred:
(i) at least a portion of the at least one residual product has been returned to the first producer;
(ii) at least a portion of the at least one residual product has been used as fuel; and
(iii) at least a portion of the at least one residual product has been sold;
calculating a price adjustment for the first producer based on the step performed with the at least one residual product.

13. The method of claim 12, wherein the at least one residual product comprises at least one of liquid petroleum gas, molecular hydrogen, and a diluent.

14. The method of claim 11, wherein the report comprises a paper report that is generated by a report producing device which is then delivered to the first producer.

15. The method of claim 11, wherein the report indicates an amount of carbon credits and/or tax benefits available to the first producer based on the amount of carbon removed from the hydrocarbon product.

16. The method of claim 11, wherein the carbon removed from the hydrocarbon product is removed principally in the form of carbon dioxide.

17. The method of claim 11, wherein the main hydrocarbon delivery system comprises one or more of a pipeline, rail tanker car, tanker truck, tanker barge and marine tanker.

18. The method of claim 11, wherein the hydrocarbon delivery system comprises at least one of a plurality of rail tanker cars, tanker trucks, tanker barges and marine tankers and wherein the hydrocarbon product comprises at least one of natural gas, oil, crude oil, heavy oil, peat, coal, biomass, bitumen, petcoke, synbit and dilbit.

19. The method of claim 11, further comprising:
providing the report or a copy thereof to an approved regulatory agency.

20. A hydrocarbon processing system, comprising:
a hydrocarbon product input connected to a main hydrocarbon transport means, wherein the main hydrocarbon transport means carries hydrocarbon products from at least a first and a second hydrocarbon producer;
a process facility connected to the hydrocarbon product input, the process facility adapted to process a hydrocarbon product of the first hydrocarbon producer and remove at least some carbon from the hydrocarbon product of the first hydrocarbon producer, whereby the at least some carbon is at least one of sequestered and utilized for enhanced hydrocarbon recovery operations; and
an accounting system adapted to determine an amount of carbon removed from the hydrocarbon product of the first hydrocarbon producer and generating a report representative of the amount of carbon that has been removed from the hydrocarbon product of the first producer.

21. The system of claim 20, wherein at least one residual product is created when the amount of carbon is removed from the hydrocarbon product, and wherein the accounting system is further adapted to determine that at least one of the following has occurred:
(i) at least a portion of the at least one residual product has been returned to the first producer;
(ii) at least a portion of the at least one residual product has been used as fuel; and
(iii) at least a portion of the at least one residual product has been sold;
and calculate a price adjustment for the first producer based on the step performed with the at least one residual product.

22. The system of claim 21, wherein the at least one residual product comprises at least one of liquid petroleum gas, hydrogen, and a diluent.

23. The system of claim 20, wherein the report comprises a paper report that is generated by a report producing device, the report then delivered to the first producer.

24. The system of claim 20, wherein the report indicates an amount of carbon credits and/or tax benefits available to the first producer based on the amount of carbon dioxide removed from the hydrocarbon product.

25. The system of claim 20, wherein the main hydrocarbon delivery system comprises one or more of a pipeline, rail tanker car, tanker truck, and ocean tanker.

26. The system of claim 20, wherein the hydrocarbon delivery system comprises at least one of a plurality of rail tanker cars, tanker trucks, tanker barges and marine tankers and wherein the hydrocarbon product comprises at least one of natural gas, oil, crude oil, heavy oil, peat, coal, biomass, bitumen, petcoke, synbit and dilbit.

27. The system of claim 20, wherein the accounting system is further adapted to provide the report or a copy thereof to a government regulatory agency.

\* \* \* \* \*